United States Patent [19]

Miron

[11] 3,726,423
[45] Apr. 10, 1973

[54] VEHICLE ATTACHMENT FOR TRANSPORTING SNOWMOBILES

[76] Inventor: Xavier Miron, 504, 37th Avenue, La Salle, Quebec, Canada

[22] Filed: Apr. 22, 1971

[21] Appl. No.: 136,440

[30] Foreign Application Priority Data

May 22, 1971 Canada..........................083,522

[52] U.S. Cl. ....................214/505, 214/85.1, 296/61
[51] Int. Cl. .............................................B60p 1/28
[58] Field of Search......................214/505, 506, 85, 214/85.1; 296/61

[56] References Cited

UNITED STATES PATENTS

| | | | |
|---|---|---|---|
| 2,550,230 | 4/1951 | Dalton | 214/505 |
| 2,727,781 | 12/1955 | D'Eath | 214/85 X |
| 2,763,384 | 9/1956 | Foster | 214/84 |
| 3,339,968 | 9/1967 | Hall | 296/61 |
| 3,352,440 | 11/1967 | Wilson | 214/85 |
| 3,536,214 | 10/1970 | Sorg | 214/85 |
| 3,550,801 | 12/1970 | Larson et al. | 214/85 X |
| 3,580,404 | 5/1970 | Moser | 214/85 |

FOREIGN PATENTS OR APPLICATIONS

| | | | |
|---|---|---|---|
| 401,813 | 11/1933 | Great Britain | 296/61 |
| 490,949 | 8/1938 | Great Britain | 214/85 |

*Primary Examiner*—Albert J. Makay
*Attorney*—Pierre Lesperance

[57] ABSTRACT

An attachment provided to be mounted on a vehicle having a rear deck, such as a pick-up truck, to adapt the vehicle for transporting snowmobiles, said attachment comprising a ramp including a first ramp section and a second ramp section, a hinge provided at one end of said first ramp section to pivotally connect the latter to the rear deck of a vehicle, the second ramp section being pivotally connected to the other end of the first ramp section, a latch means attached to the first ramp section and adapted to hold the latter in a transport position and a tiltable platform adapted to be pivotally mounted in an elevated position with one end of said platform adjacent said one end of the first ramp section and hydraulic actuators adapted to be connected to pivot the first ramp section and the platform between a loading-unloading position and a transport position.

15 Claims, 11 Drawing Figures

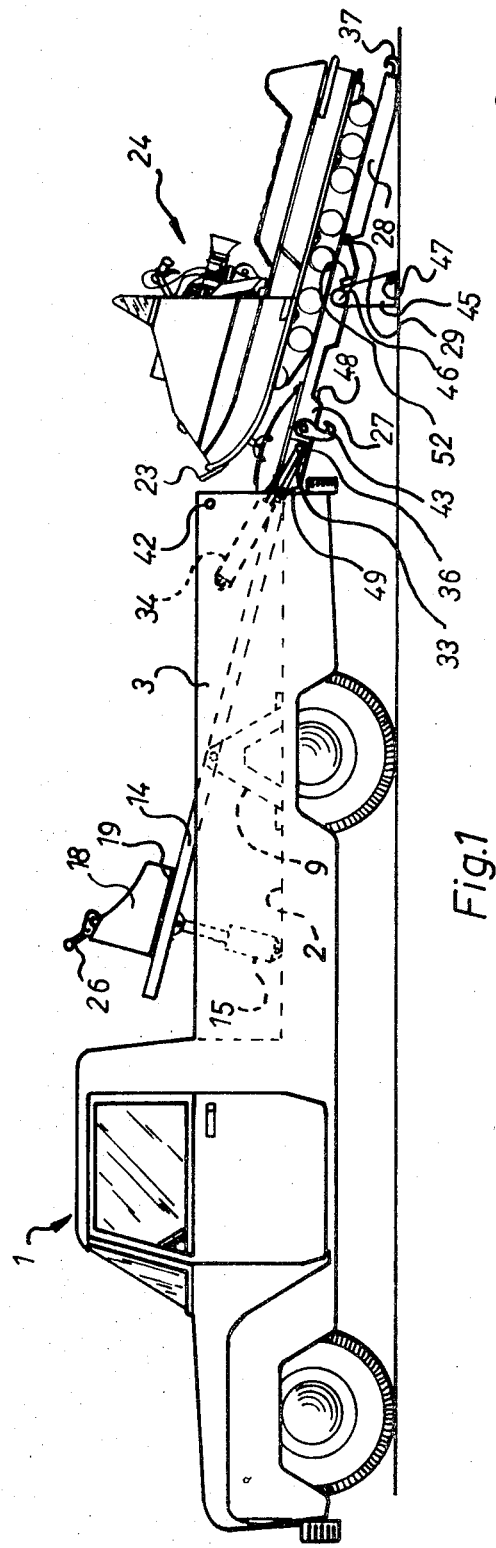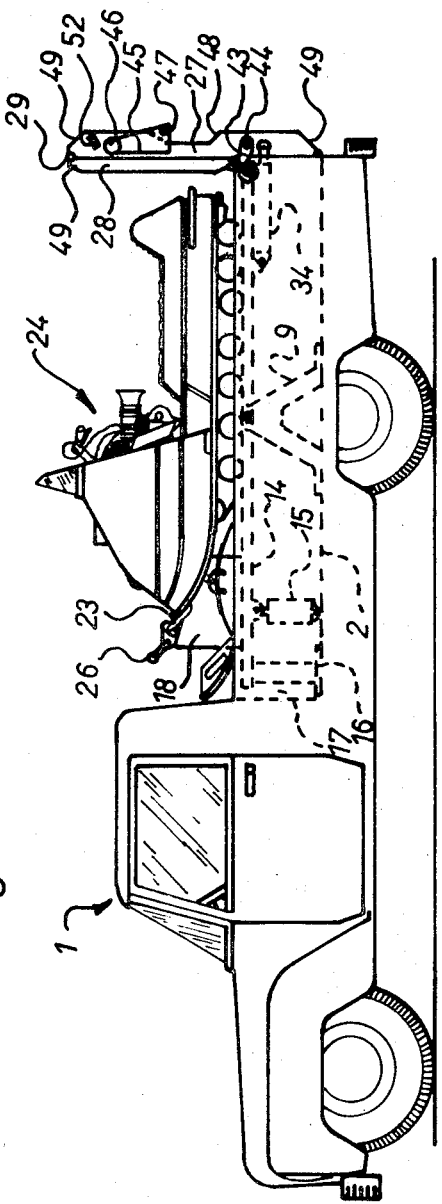
Fig.1
Fig.2
INVENTOR
Xavier MIRON
BY Pierre Lesperance
AGENT

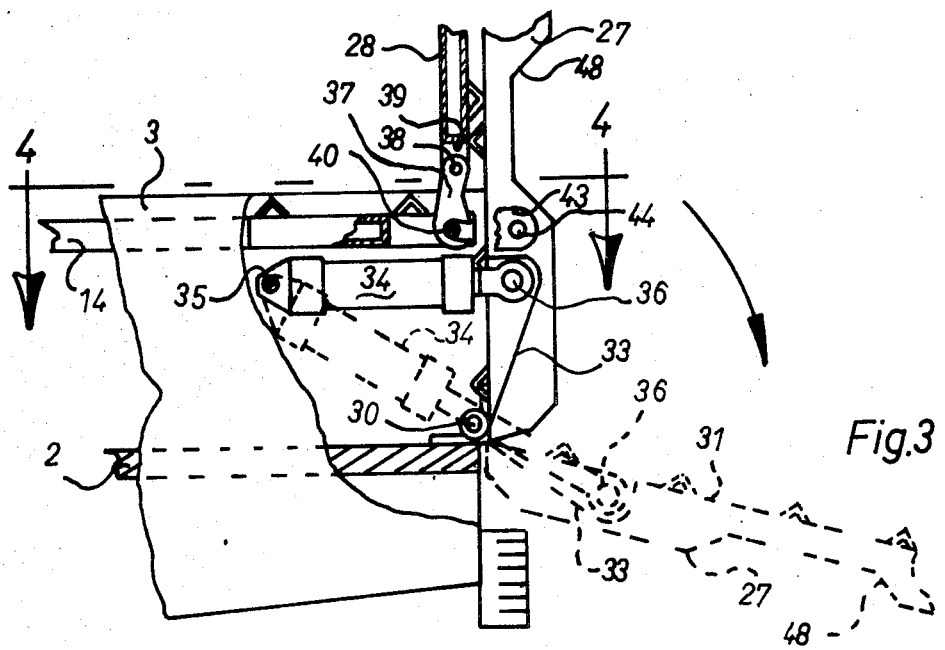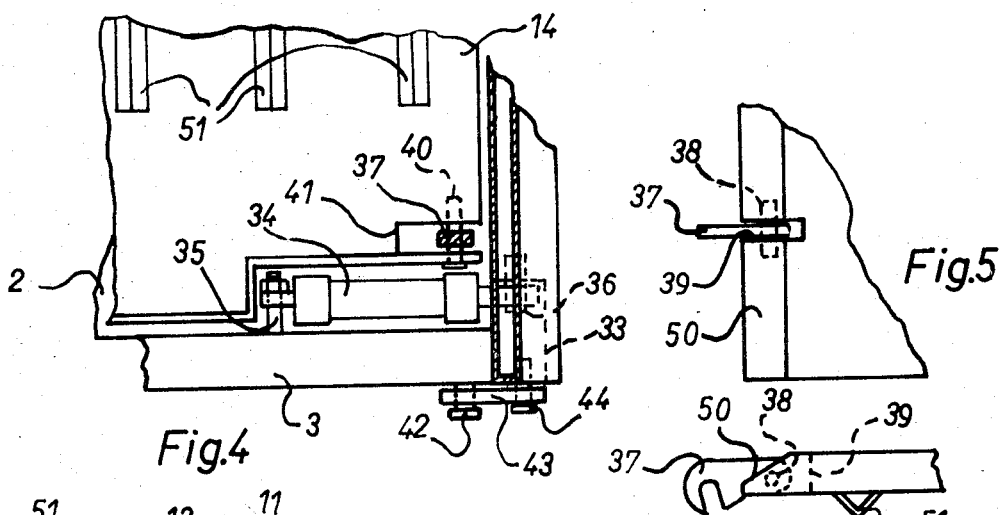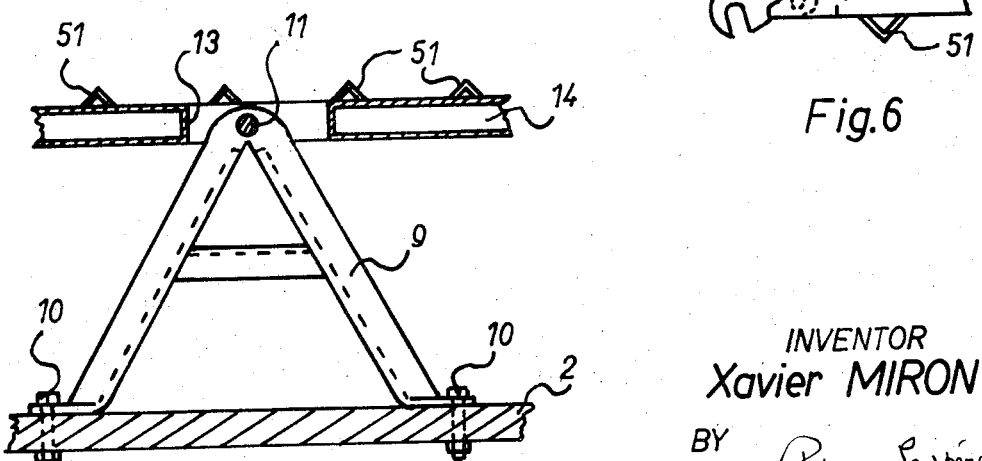

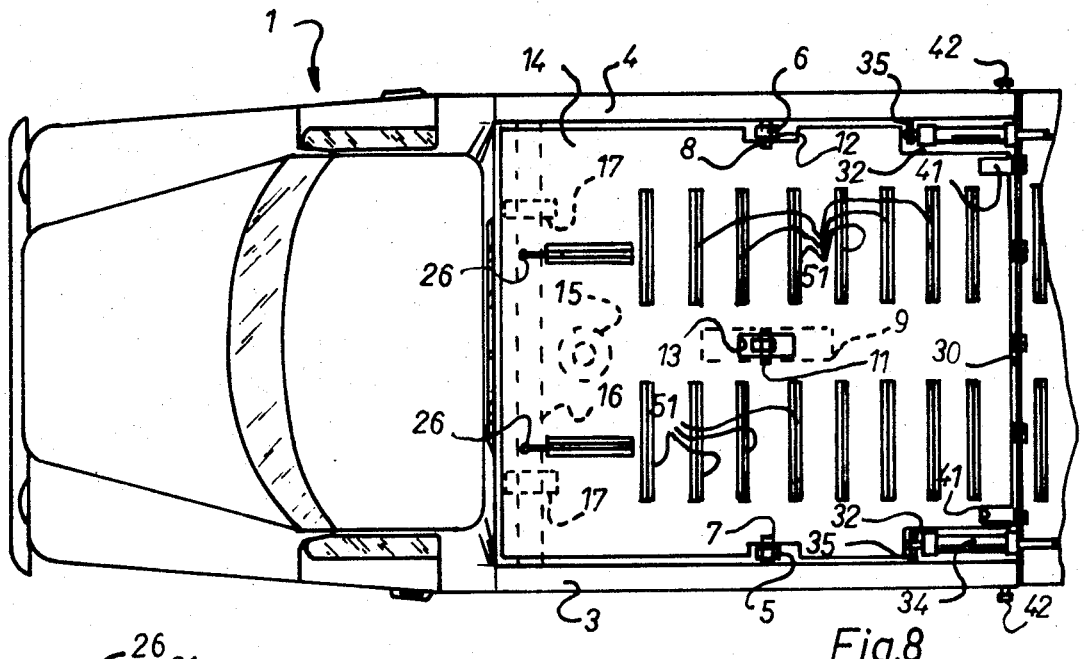
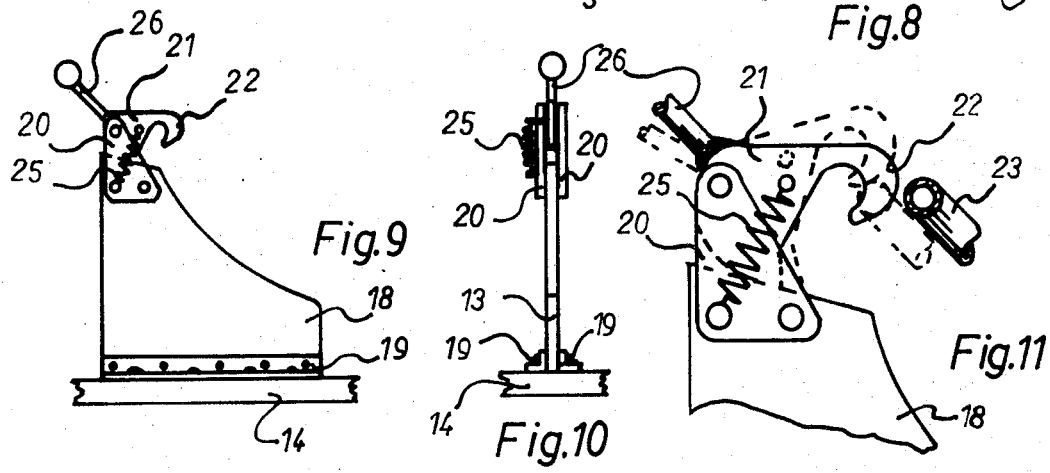
INVENTOR
Xavier MIRON
BY Pierre Lespérance
AGENT

VEHICLE ATTACHMENT FOR TRANSPORTING SNOWMOBILES

The present invention relates to a vehicle attachment for transporting snowmobiles and, more particularly, to a vehicle attachment to be mounted on a pick-up truck for transporting snowmobiles.

The most commonly adopted method of transporting snowmobile is by means of a trailer pulled by a motor vehicle, such as an automobile or a truck. It is also possible to transport snowmobiles in pick-up trucks. Each of the known methods of transportation snowmobiles presents some difficulties to get the snowmobile unto and off the rear deck of a truck and to positively hold the snowmobiles against forward and rearward displacements.

It is an object of the invention to obviate the above disadvantages by providing, for a motor vehicle, an attachment constructed and arranged to facilitate the loading and unloading of snowmobiles on the vehicle, to allow the transport of two snowmobiles side by side, to be power operated, and to positively and safely hold the platform and the ramp in their transport positions.

The present invention defines an attachment for a vehicle and, more particularly, for a pick-up truck, the attachment comprising a ramp which is articulated and collapsible permitting the use of a ramp of greater overall length allowing a more gentle slope.

The invention also provides an elevated and tiltable platform forming an inclined plane to facilitate the backing of snowmobiles, particularly those having no reverse drive, and the positioning of the platform above the inwardly extending bosses which are provided around the rear wheels on some models of pick-up trucks. The invention also provides latch means to safely secure the platform and the ramp against undesired displacements.

In the accompanying drawings which illustrate a preferred embodiment of the invention:

FIGS. 1 and 2 are side views of an attachment, according to the invention, operatively associated with a pick-up truck;

FIG. 3 is an enlarged partial view of the invention showing the relationship between the ramp and the platform;

FIG. 4 is a cross-sectional view as seen in the direction of the arrows along line 4—4 in FIG. 3;

FIGS. 5 and 6 are respectively plan and elevation views of a hook at the free end of the ramp;

FIG. 7 is an elevation view of a support for the platform;

FIG. 8 is a top view of the truck and the associated platform shown in FIG. 1;

FIG. 9 is an elevation view of a hook device for restraining a snowmobile on the platform against forward and rearward displacements;

FIG. 10 is an elevation view as seen from the right in FIG. 9; and

FIG. 11 is an enlarged view of the hooking mechanism illustrated in FIG. 9.

In the drawings, the attachment according to the invention is mounted on a pick-up truck 1, but it could be mounted on various other types of vehicles, motorized or not.

The pick-up truck 1 is provided with a rear deck 2 and has a pair of side panels 3 and 4. A post 5 is fixed adjacent the side panel 3 and a similar post 6 is fixed adjacent the other side panel 4 on the inner side thereof. A pair of aligned pivots 7 and 8 extend horizontally and rotatably through the upper end of the posts 5 and 6. The pivots 7 and 8 are aligned with each other transversely relative to the truck. A trestle 9 is fixed unto the rear deck 2 by bolts 10 or other known expedients, such as screws. The trestle 9 is located intermediate the posts 5 and 6. A pivot 11 is rotatably mounted at the upper end of the trestle 9 in alignment with the pivots 7 and 8. Recesses 12 and 13 are provided in the generally rectangular platform 14 to allow spaces for the upper ends of the posts 5 and 6 and the trestle 9. The pivots 7, 8, and 11 are fixed to the platform 14 for rotation therewith.

A hydraulic piston 15, preferably of the double action type, is connected between the rear deck 2 and the undersurface of the front portion of the platform 14. The piston 15 serves to pivot the platform 14 between a loading-unloading position, illustrated in FIG. 1, and a transport position illustrated in FIGS. 2, 4, 7, and 8. A base plate 16 is fixed transversely unto the front portion of the rear deck 2 and carries a pair of rest posts 17 adapted to support the platform 14 when the latter is lowered unto the above rest posts 17.

On the front portion of the platform 14, there are provided two hook devices arranged in spaced-apart relationship transversely relative to the truck 1 and the platform 14. Each hook device comprises a vertical plate 18 fixed by angles 19, or other expedients, unto the top surface of the front portion of the platform 14. A pair of flanges 20 are fixed on the opposite sides respectively of each plate 18 and projects upwardly therefrom in spaced parallel relationship. A hook element 21 is pivotally connected between the flanges 20. The hook element 21 has a hook portion 22 projecting rearwardly toward the snowmobiles receiving portion of the platform 14 to firmly engage a part of a snowmobile, such as the tubular part 23 of a snowmobile 24, to restrain the snowmobile against undesirable forward and rearward displacement.

A spring 25 is connected between the hook element 21 and a flange 20, such as to bias the hook portion 22 downwardly into locking position.

An actuating arm 26 is attached to the hook element 21 to pivot the latter, such as to actuate the same manually if required. The hook portion 22 is provided with an outside profile or configuration and is so positioned as to allow automatic engagement of the hook portion 22 around the tubular part 23 under the camming action of the part 23 engaging the outside of the hook portion 22.

The ramp includes a first ramp section 27 and a second ramp section 28, which are pivotally connected to each other, at one of their ends, by a transversely extending pivot 29.

A hinge 30 pivotally connects the other end of the first ramp section 27 to the rear edge of the deck 2, as is best shown in FIG. 3. The hinge 30 is so arranged that, when the first ramp section 27 is lowered to a loading-unloading position, the top surface 31 of the first ramp section 27 is substantially even with the rear edge of the top surface of the rear deck 2. Similarly, when the tiltable platform 14 is in the tilted loading-unloading position, shown in FIG. 1, the top surface of the platform forms an inclined plane which is also substantially even with the rear edge of the top surface of the deck 2. The platform 14 is provided with a pair of recesses 32 at the rear corners thereof and the first ramp section 27 is provided with a pair of cavities or recesses 33 respectively aligned with the recesses 32. A hydraulic cylinder 34, of the double action type, is pivotally mounted in each pair of aligned recesses 32,33. One end of each cylinder 34 is pivotally mounted on a stud pivot 35 projecting inwardly from the side panel 3 or 4, and the other end of each hydraulic cylinder 34 is pivotally mounted on a pivot 36 extending transversely relative to the truck within the corresponding recess 33. The hydraulic cylinders 34 on the opposite sides of the vehicle are arranged to cause pivoting of the ramp about the axis of the hinge 30.

A pair of hooks 37 are pivotally mounted by pivots 38 in slots 39 extending longitudinally into the second ramp section 28, from the free edge thereof. As can best be seen in FIGS. 3 and 4, the hooks 37 are adapted to engage a pair of associated pins 40 extending transversely through the openings 41 provided at the rear end of the platform 14. The hooks 37 serve in the transport position to hold together the second ramp section 28 and the platform 14 in order to provide a firm support for the platform, to avoid undue movements of the components, and the easily imagined annoying consequences of such movements.

A pin 42 is fixed to the upper rear corner of each of the panels 3 and 4 and projects from the outside face thereof. A hook 43 is pivotally mounted on a pin 44 on each side of the first ramp section 27. The hooks 43 are arranged to engage the pins 42 and to retain the ramp in the elevated transport position when the first ramp section 27 has been moved to its transport position.

A ramp trestle is provided to support the ramp in proper loading-unloading position, as shown in FIG. 1. The ramp trestle includes a pair of rigid plates 45 defining supporting legs on each side of the ramp. The rigid plates or legs 45 have one end freely pivoted at 46 on the outside of the first ramp section 27.

A rod 47 joins the lower ends of the two plates 45 to give rigidity to the ramp trestle. When the ramp is pivoting toward the loading-unloading position, the ramp trestle freely pivots under gravity around the axis of the pivots 46 until it takes a ramp supporting position, for instance as shown in FIG. 1.

An abutment or stop 52 is provided on each side of the first ramp section 27, slightly behind the pivoting movement thereof. Inversely, when the ramp is pivoting toward the transport position, the ramp trestle pivots freely toward the position shown in FIG. 2 wherein the rod 47 engages in a transversely extending recess 48.

The ramp sections 27 and 28 are bevelled at 49 to allow the necessary pivoting of the ramp sections relative to each other and to the truck. The free end of the second ramp section 28 is also bevelled at 50 to allow the top surface of that section to be as near as possible to the ground when the ramp is in the loading-unloading position.

The top surfaces of the two ramp sections 27 and 28 and of the platform 14 are provided with two longitudinal rows of transversely extending traction increasing elements 51. Two rows are provided, one for each of the two snowmobiles, which can take place side by side on the platform 14; but, obviously, only one row extending practically the full width of the ramp and the platform could instead be provided.

The illustrated traction increasing elements have an inverted V-shaped cross-section, but other shapes could be used as well. For example, the top surface of the platform and the ramp sections could be defined by a metal plate or covered with a metal plate or sheet having corrugations or the like extending transversely and forming the traction increasing elements.

It must be appreciated that the ramp and the platform are removably mounted on the vehicle in order to allow the use of the vehicle for other purposes.

I claim:

1. A vehicle attachment for transporting snowmobiles comprising a first ramp section, a hinge means provided at one end of said first ramp section and arranged to pivotally attach the latter to a vehicle, a second ramp section pivotally connected to the other end of said first ramp section, a latch means attached to said first ramp section and adapted to co-operate with a complementary latch means on the vehicle such as to hold the first ramp section in the upright position, a tiltable platform constructed and arranged to be pivotally mounted with one end adjacent said one end of said first ramp section, and hook means carried by the free end of said second ramp section arranged to engage and support said one end of the tiltable platform in the transport position.

2. A vehicle attachment as defined in claim 1, wherein leg means are freely pivoted to said first ramp section between an operative ramp supporting position and a retracted transport position.

3. A vehicle attachment as defined in claim 2, wherein an abutment is provided to arrest said leg means in said operative ramp supporting position.

4. A vehicle attachment as defined in claim 1, wherein said latch means includes a hook pivotally mounted on each side of the first ramp section such as to engage said complementary latch means on the opposite sides of the vehicle.

5. A vehicle attachment as defined in claim 1, wherein said first ramp section is longer than said second ramp section and both said ramp sections are provided with transversely extending traction increasing elements.

6. In a vehicle having a frame defining a rear deck, a vehicle attachment for transporting snowmobiles comprising a first ramp section, a hinge means at one end of said first ramp section pivotally connecting the latter to the vehicle, a second ramp section pivotally connected to the other end of said first ramp section, a latch means attached to said first ramp section and adapted to cooperate with a complementary latch means on the vehicle such as to hold the first ramp section in an upright position, a tiltable platform pivotally mounted on said rear deck with one end thereof adjacent said one end of said first ramp section, hook means carried by the free end of said second ramp section and arranged to engage and support said one end of the tiltable platform in the transport position.

7. A vehicle as defined in claim 6, wherein double action hydraulic actuator means is connected between said vehicle frame and said first ramp section such as to pivot the latter about said hinge means.

8. A vehicle as defined in claim 7, wherein said double action hydraulic actuator means comprises a pair of hydraulic cylinders respectively connected on the opposite sides of the first ramp section.

9. A vehicle as defined in claim 6, wherein said tiltable platform is pivotally mounted about an axis extending in an elevated position relative to said rear deck.

10. A vehicle as defined in claim 6, wherein a hydraulic cylinder is connected between said frame and said tiltable platform such as to pivot the latter.

11. A vehicle as defined in claim 6, wherein rest posts are provided under the other end of the tiltable platform to rest the latter in the transport position.

12. A vehicle as defined in claim 6, wherein a blocking means is provided on the other end of the tiltable platform to immobilize the snowmobiles in the transport position on the tiltable platform.

13. A vehicle as defined in claim 12, wherein said blocking means comprises a pair of spring biased hooks located in transversely spaced-apart positions on said other end of the tiltable platform.

14. A vehicle as defined in claim 6, wherein said hinge means pivotally connects said first ramp section to a transversely extending rear edge of said rear deck and said tiltable platform is pivoted about an axis extending transversely of said vehicle in elevated position relative to said rear deck and parallel to said rear edge.

15. A vehicle as defined in claim 6, wherein said vehicle attachment is removably attached to the vehicle frame.

* * * * *